(12) United States Patent
Kenst et al.

(10) Patent No.: US 8,458,350 B2
(45) Date of Patent: Jun. 4, 2013

(54) CONTROL AND COMMUNICATIONS ARCHITECTURE

(75) Inventors: James W. Kenst, Richmond Heights, OH (US); Kyle E. Neet, University Heights, OH (US); Gary W. Baczkowski, Seven Hills, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1403 days.

(21) Appl. No.: 11/864,641

(22) Filed: Sep. 28, 2007

(65) Prior Publication Data

US 2008/0109829 A1 May 8, 2008

Related U.S. Application Data (60) Provisional application No. 60/864,221, filed on Nov. 3, 2006.

(51) Int. Cl.
*G06F 15/173* (2006.01)
(52) U.S. Cl.
USPC ........... 709/230; 709/232; 709/233; 709/234; 709/235; 709/236; 709/237
(58) Field of Classification Search
USPC ................. 709/230, 232, 234, 235, 236, 237
See application file for complete search history.

(56) References Cited

U.S. PATENT DOCUMENTS

| | | | |
|---|---|---|---|
| 6,014,380 A | 1/2000 | Hendel et al. | |
| 6,425,038 B1* | 7/2002 | Sprecher | 710/269 |
| 6,457,059 B1 | 9/2002 | Kobayashi | |
| 7,042,877 B2* | 5/2006 | Foster et al. | 370/389 |
| 7,103,675 B1 | 9/2006 | Freedman | |
| 7,170,897 B2 | 1/2007 | Mackiewich et al. | |
| 7,302,485 B2 | 11/2007 | Bauer et al. | |
| 7,307,945 B2 | 12/2007 | Gerdisch et al. | |
| 7,330,473 B1* | 2/2008 | Baier et al. | 370/401 |
| 7,411,915 B1* | 8/2008 | Spain et al. | 370/250 |
| 7,536,548 B1* | 5/2009 | Batke et al. | 713/166 |
| 8,140,658 B1* | 3/2012 | Gelvin et al. | 709/224 |
| 2004/0006652 A1* | 1/2004 | Prall et al. | 709/318 |
| 2005/0038885 A1 | 2/2005 | Agrusa et al. | |
| 2006/0155865 A1* | 7/2006 | Brandt et al. | 709/230 |
| 2006/0172427 A1* | 8/2006 | Germouni et al. | 436/55 |
| 2007/0230465 A1 | 10/2007 | Shankara | |

OTHER PUBLICATIONS

ODVA, DeviceNet—Technical Overview, Copyright 2004, 8 pages.*

* cited by examiner

*Primary Examiner* — Hieu Hoang
(74) *Attorney, Agent, or Firm* — Raymond Speroff; Turocy & Watson, LLP; John M. Miller (57) ABSTRACT

An industrial automation system is provided. The system includes a link layer that includes one or more ports that can communicate via one or more communication protocols. An application layer communicates with one or more network objects and a core layer bridges the application layer and the link layer.

17 Claims, 10 Drawing Sheets

CONTROL AND COMMUNICATIONS ARCHITECTURE

CROSS REFERENCE TO RELATED APPLICATION

This application claims the benefit of U.S. Provisional Patent Application No. 60/864,221 entitled CONTROL AND COMMUNICATIONS ARCHITECTURE, and filed on Nov. 3, 2006, the entirety of which is incorporated herein by reference.

TECHNICAL FIELD

The claimed subject matter relates generally to industrial control systems and more particularly to control and communications where a core component maps multiple communications ports to one or more network applications.

BACKGROUND

In recent years, there has been a growing need to integrate industrial control systems across a plurality of different types of networks and protocols while maintaining communications performance of smaller or more-proprietary systems. One problem here is that often times a desired communication interface and required communications services do not match. For code compatibility, it may be desirable to use an existing industrial protocol interface, yet there is a need for higher level services, such as gateway functions, multicast or time synchronization, which generally are not available. In many cases, either the communication service interface need to be changed to a more full featured protocol or the existing protocol need be enhanced to support the required features.

Along with communicating on a desired network, consider the situation where a PLC desires to implement connectivity via an industrial network protocol. Newer protocols such as EtherNet/IP have a rich set of application-level objects as well as complex network protocol layers. A PLC implementing EtherNet/IP connectivity will find it useful to include application layer features (application objects). However, it is desirable not to require the PLC processor to implement the entire EtherNet/IP network layer. There are several current methods in which industrial protocol support is implemented in PLCs. Existing EtherNet/IP implementations, for example, generally implement the network and application layers in the PLC itself, using the backplane between the PLC and Network Interface Module as a network hop. For older and simpler protocols, PLCs often use a dual-port or memory-map interface between the PLC and Network Interface Module to transport the actual industrial protocol packets.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

A layered communications architecture is provided that facilitates communications between multiple ports and network applications while allowing data produced by an application object within a module to be produced through multiple communications ports. In one aspect, a communications stack supports one-to-many different or same link protocols without altering its fundamental network behavior or design. For instance, the particular protocol of a message packet actually sent or received should not be particularly relevant to its fundamental network behavior. Providing this network abstraction supports systems or modules with multiple ports, sometimes referred to as a multi-port device. This also allows adding new link protocols in the future without re-implementing or altering the module or system's underlying behavior. In another aspect, flexible capability is provided for delivering a connection data payload to multiple destinations. For data consumption, these destinations can be application objects or data producer objects in other communication ports, where such behavior can be referred to as multicasting within a module. For production, the destinations can be a producer object in one or more communication ports.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

An industrial control communications architecture is provided. In one aspect, an industrial automation system is provided. The system includes a link layer that includes one or more ports that can communicate via one or more communication protocols. An application layer includes one or more application objects or components and a core layer bridges the application layer and the link layer. The communications protocols can include industrial protocols, network protocols, backplane protocols, serial protocols, and wireless protocols, for example, where the industrial protocols can be associated with the Common Industrial Protocol (CIP), for example.

It is noted that as used in this application, terms such as "component," "module," "layer," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

Figure 1:
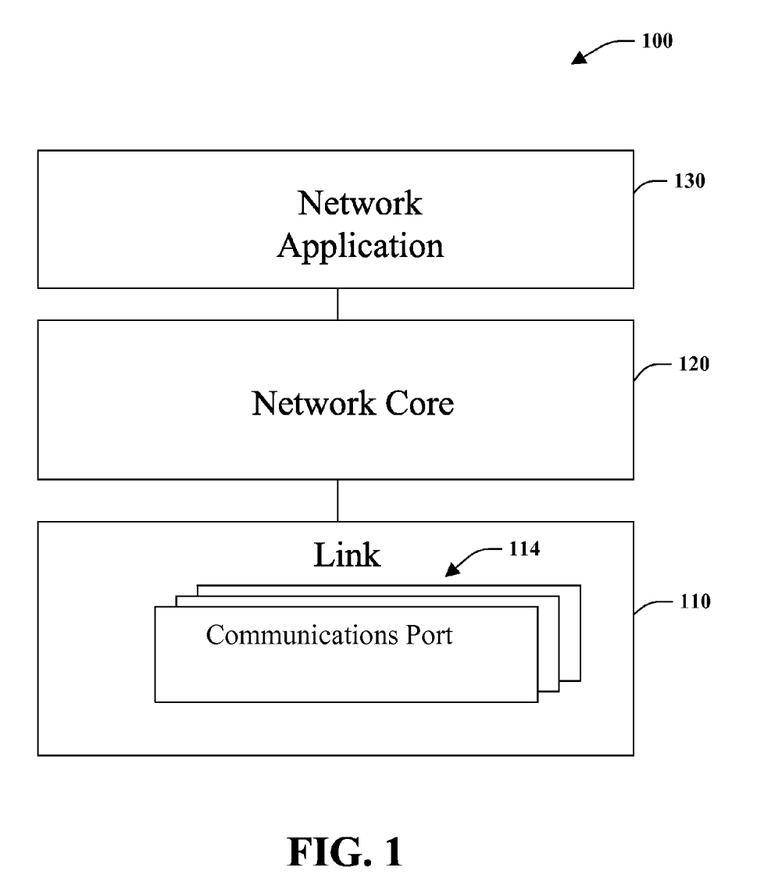
FIG. 1 is a schematic block diagram illustrating industrial control communications architecture for an industrial automation system.

Referring initially to FIG. 1, an industrial communications architecture 100 is provided for an industrial automation system. A link layer 110 includes one or more communication port components 114 that drive individual data links. Communication ports 114 are typically installed when the system is initialized based on a product configuration. A communication port 114 can include an unconnected message manager (UCMM), link producers, link consumers, and data link specific behavior such as encapsulation and a link device driver, for example which are described in more detail below. A core layer 120 includes core components to provide an application to link layer 110 interface. This can include message router services, a connection manager, and connection transports, for example. Transports can be encapsulated in a component referred to as a transport manager (not shown).

The application layer 130 includes application objects that are included in the particular system or module. Application objects or components are typically instantiated when the system is initialized based on the respective configuration. However, they may also be instantiated by, and directly associated with, another component—a link layer communications port, for example. An application object can be defined to facilitate the use of a network stack by non-network applications such as a web and OPC-DX (OLE for Process Control Data Exchange) server applications, for example. This interface object manages the network-specific behavior such as opening, closing, and managing application connections and unconnected message transactions. One feature is to offload this detail from other applications within the respective host processor.

The system 100 provides a layered communications architecture that facilitates communications between multiple ports 114 and network applications 130 while allowing data produced by an application object within a module to be produced through multiple communications ports. In one aspect, a communications stack (not shown) supports one-to-many different or same link protocols without altering its fundamental network behavior or design. For instance, the particular protocol of a message packet actually sent or received should not be particularly relevant to its fundamental or base network behavior. Providing this network abstraction supports systems or modules with multiple ports, sometimes referred to as a multi-port device. This also allows adding new link protocols in the future without re-implementing or altering the module or system's underlying behavior. In another aspect, flexible capability is provided for delivering a connection data payload to multiple destinations. For data consumption, these destinations can be network application objects or data producer objects in other communication ports. For production, the destinations can be a producer object in one or more communication ports 114, where such behavior can be referred to as multicasting within a module. Specific examples of the link layer 110, network core 120, and network applications 130 will be described in more detail with respect to FIG. 2.

In another aspect, a communications system 100 for an industrial controller is provided. The system 100 includes means for communicating (link layer 110) with one or more ports that employ one or more communication protocols and means for communicating with one or more applications objects (application layer 130). The system also includes means for bridging multiple communications layers (provided by core layer 120) to support messaging between the one or more ports and the one or more network objects.

It is noted that components associated with the industrial control system 100 can include various computer or network components such as servers, clients, programmable logic controllers (PLCs), communications modules, mobile computers, wireless components, control components, and so forth, which are capable of interacting across a network. Similarly, the term PLC as used herein can include functionality that can be shared across multiple components, systems, and/or networks. For example, one or more PLCs can communicate and cooperate with various devices across the network. This can include substantially any type of control, communications module, computer, I/O device, sensor, Human Machine Interface (HMI)) that communicate via the network which includes control, automation, and/or public networks. The PLC can also communicate to and control various other devices such as Input/Output modules including Analog, Digital, Programmed/Intelligent I/O modules, other programmable controllers, communications modules, sensors, output devices, and the like.

The network can include public networks such as the Internet, Intranets, and automation networks that include protocols such as Common Information Protocol (CIP) including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 2:
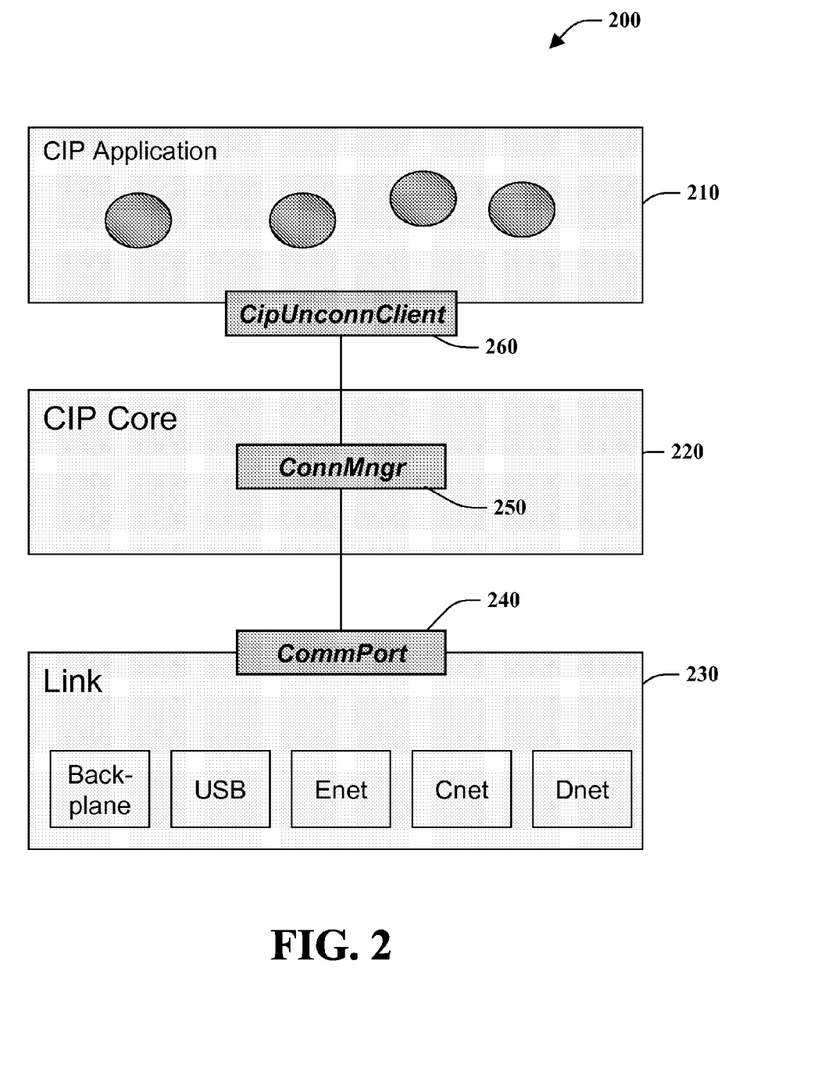
FIG. 2 is a diagram that illustrates an example communications architecture.

FIG. 2 illustrates an example of a layered communications architecture 200. In this aspect, a CIP (Common Industrial Protocol) application layer 210 communicates through a CIP core 220 with a CIP link layer 230. As shown, the CIP link layer supports various communications protocols such as backplane, USB, EtherNet/IP, ControlNet, DeviceNet, and so forth, for example. Thus, the link layer 230 supports a multi-stack architecture that allows various differing protocols to communicate across the architecture 200. As illustrated, the architecture 200 can also include a communications port 240, a connection manager 250, and a CIP unconnected client interface 260.

In general, the CIP application 210 supports interfaces (260 for example) to CIP core layer 220. It is to be appreciated that CIP is an exemplary protocol and that other network protocols can be similarly adapted and interfaced. Various types of objects can be provided to support communications between layers and between components of a system. These can include CIP-aware application objects that support interfaces to the CIP core layer 220. Link-specific application objects are instantiated by a communications port within the respective link layer 230. These are standard CIP application objects in that they support data flows for CIP accesses but also allow direct association between that link-specific object and its instantiating port. Other applications can include gateways to non-CIP clients, such as OPC/DX, Java Virtual Machine (JVM) and so forth.

The link layer 230 includes one or more communication ports including backplane ports, USB ports, Ethernet ports, and other examples such as DeviceNet and ControlNet ports, for example. The various ports provide access and management of link-specific protocols. This includes link-specific drivers/Interfaces to data link (e.g., network, I/O bus, and so forth). Other components in the link layer 230 not shown include an Unconnected Message Manager, Link Producers, and Link Consumers. The CIP Core 220 provides components for an application to link layer interface. This includes the Connection Manager 250 which facilitates connection creation and management and is a facilitator for unconnected message origination. Transports in the core layer 220 provide the connected data interface between application and link objects. The core layer 220 can also include Message Router Services that encapsulates knowledge of message router request and response formats. The core layer 220 can also include a registry for applications that support CIP (or other network protocol) unconnected message target behavior.

Figure 3:
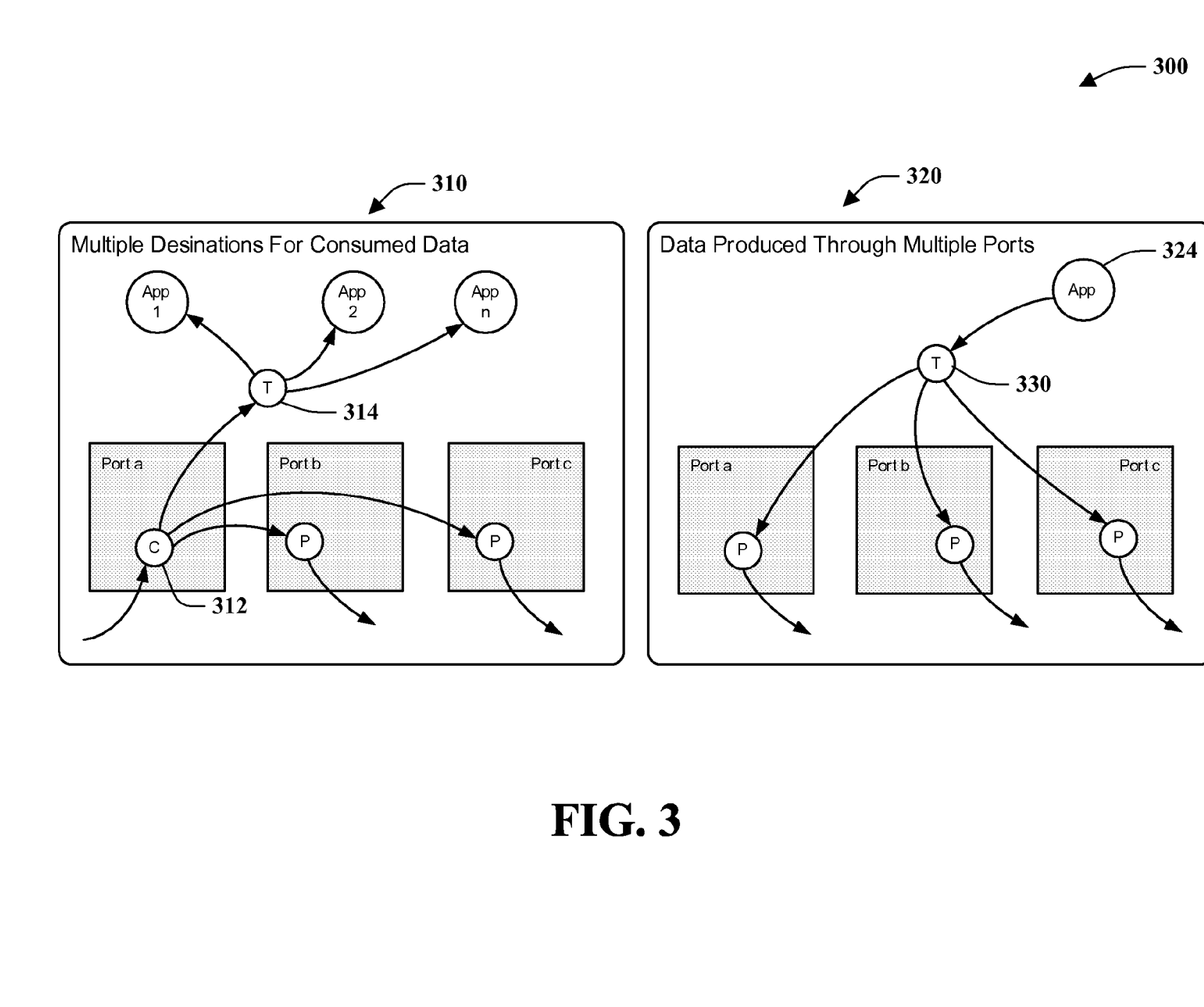
FIG. 3 is a diagram of an example communications data flow illustrating the multicasting within a device concept for consumed and produced packets.

FIG. 3 illustrates an example communications diagram 300 that illustrates data flows between applications and communications port objects. A communications stack (not shown) supports one-to-many different or same link protocols (e.g. Enet/IP, Cnet, USB, etc.) without altering its fundamental CIP behavior. The particular protocol of a message packet actually sent or received on a network should not be particularly relevant to its CIP behavior. Meeting this network abstraction allows its use in products with multiple ports, sometimes referred to as a multi-port device. This also allows adding new link protocols in the future without re-implementing or altering the product's CIP (or other network) behavior. Another aspect of the layered architecture is the capability of delivering a CIP connection data payload to multiple destinations. For consumption, these destinations can be CIP application objects or producer objects in other communication ports. For production, the destinations can be a producer object in one or more communication ports. This behavior can be referred to as multicasting within the module.

For example, as shown at 310 of FIG. 3, a consumed data packet 312 for a link connection should be able to be sent to multiple destinations. This would occur if multiple applications within the module or on different networks established a connection to the same transport 314. This is analogous to network multicasting in which a transmitted (e.g., produced) data packet is received (e.g., consumed) by multiple destination devices on the network. In this case, the destinations are within the communication module itself. Similarly, as shown at 320, data produced by an application object 324 within a module may need to be produced through multiple communication ports. This would occur if multiple connections are established to the same transport object connection point 324 through different communication ports from connection originators in nodes on different networks.

Figure 4:
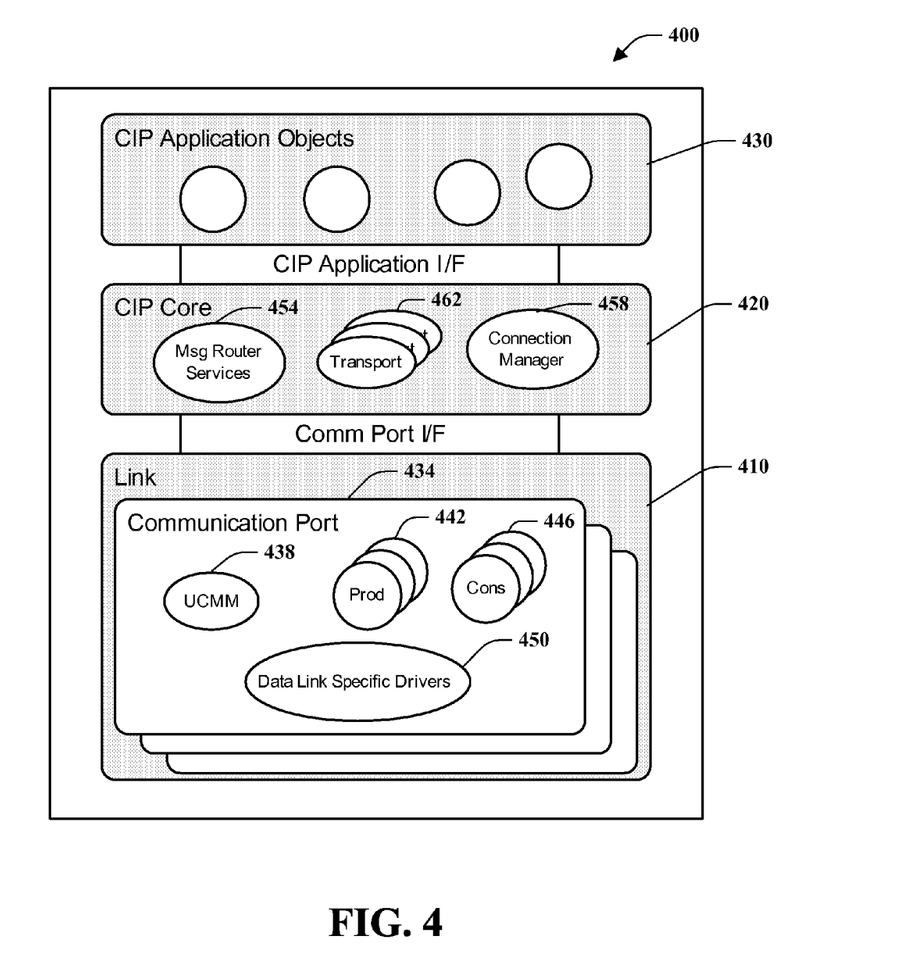
FIG. 4 illustrates a more detailed stack structure for communicating between layers.

Referring now to FIG. 4, a more detailed stack structure is illustrated for communicating between layers. A general stack is 400 is illustrated. The stack 400 can be partitioned into three primary layers: a Link 410, a CIP Core 420, and a CIP Application 430. The link layer 410 includes communication port components that drive individual data links. Communication ports are typically installed when the system is initialized based on a given configuration. A communication port 434 can include an unconnected message manager (UCMM) 438, link producers 442, link consumers 446, and data link specific behaviour such as encapsulation and a link device driver 450. From the communication port's perspective, a CIP packet is its link's data payload. A communication port 434 generally does not process unconnected messages for routing or connection setup purposes.

The CIP core layer 420 includes core components to provide the application to link layer interface. This includes message router services 454, a connection manager 458, and connection transports 462. Transports 462 can be encapsulated in a component referred to as the transport manager. The CIP application layer 430 includes CIP application objects that are included in the particular product or system. Application objects are typically instantiated when the system is initialized based on the product configuration. The CIP application object can be defined to facilitate the use of the CIP stack by non-CIP applications such as a web and OPC-DX server applications, for example. The CIP Application interface includes various interfaces that support CIP-specific behaviour such as opening, closing, and managing CIP connections and unconnected message transactions.

In addition to the component definitions provided above, the use of the term component with reference to the following discussion implies an object with more behaviour than a simple object. Thus, a component provides its interface(s) via a class definition but doesn't necessarily have to be all encompassed by that class. That may be the only class in the component that provides any public exposure. By component, a grouping of objects is implied, either embedded within, or created and referenced, to perform a given amount of work. It may create one or more separate execution threads (e.g., tasks) sometimes referred to as active objects, to perform its functions. The term object as used herein is in a generic sense. This can imply a simple object or a more complex data structure or function. Additionally, data movement throughout the communication stack 400 can be achieved by encapsulating the data in the object acting on that data.

Before proceeding, the Message Router Services 454 and the connection manager 458 are described in more detail. These provide a central hub for unconnected messaging, via client and/or server. These components 454 and 458 facilitate communications activity and dynamic linking that occurs between other objects. Each provides registration services that allow other objects to link into the stack 400, as they are instantiated. The Message Router Services 454 and the Connection Manager 458 can be a single-instance object that is instantiated during initialization of a communications application. A pointer to their public interface can be made globally available to allow other objects access to the components.

The message router services 454 encapsulate knowledge of the Message Router Request/Response format. This includes encode/decode of a message router formatted message, as well as decoding CIP path fields that are isolated to this component. Application objects that support being the target of an unconnected message register their unconnected message target interface with a RegisterClass or RegisterSymbol service, for example. Objects that dispatch unconnected message requests to target objects use MsgRtrServices methods to decode a new unconnected server request to parse out the message router header and obtain the object pointer to the target object. Unconnected message dispatchers are communication port UCMM's and the message router application (a CIP application object), among others.

The connection manager 458 uses a ParseCmPath service to parse path fields that may be embedded in its service request packets (e.g., fwdopen, fwdclose, and so forth). The path decode behaviour aggregates CIP path segment knowledge in one area for efficient data processing. Other services are provided to support building unconnected server responses and client requests, and for decoding client responses. The connection manager 458 acts as a conductor for opening and closing CIP (or other network) connections. Primitive services are provided in other components that contain objects associated with CIP connections, but the logic for how and when to use these services is isolated in the connection manager. This partitioning avoids fragmenting the logic for managing connection resources into multiple places.

When the connection manager 458 initialized, it registers with the message router services 454 as an unconnected message target object like other application objects that supports unconnected message target behaviour. When a connection is originated from a different node, the connection open request (e.g., FwdOpen) is received through a communication port as an unconnected message server transaction. The connection manager 458 receives the open request and then collaborates with the communication port where it came in and another component—another communication port if it's a bridged connection or an application object if it's an application connection—to establish the connection. When a connection is originated from within the communication module, the connection open request is received from a CIP application object collaborating with the connection manager 458.

FIGS. 5-9 illustrate example communications methods for communicating between ports and objects in accordance with a layered stack architecture. While, for purposes of simplicity of explanation, the communications methodologies are shown and described as a series of acts, it is to be understood and appreciated that the methodologies are not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

Figure 5:
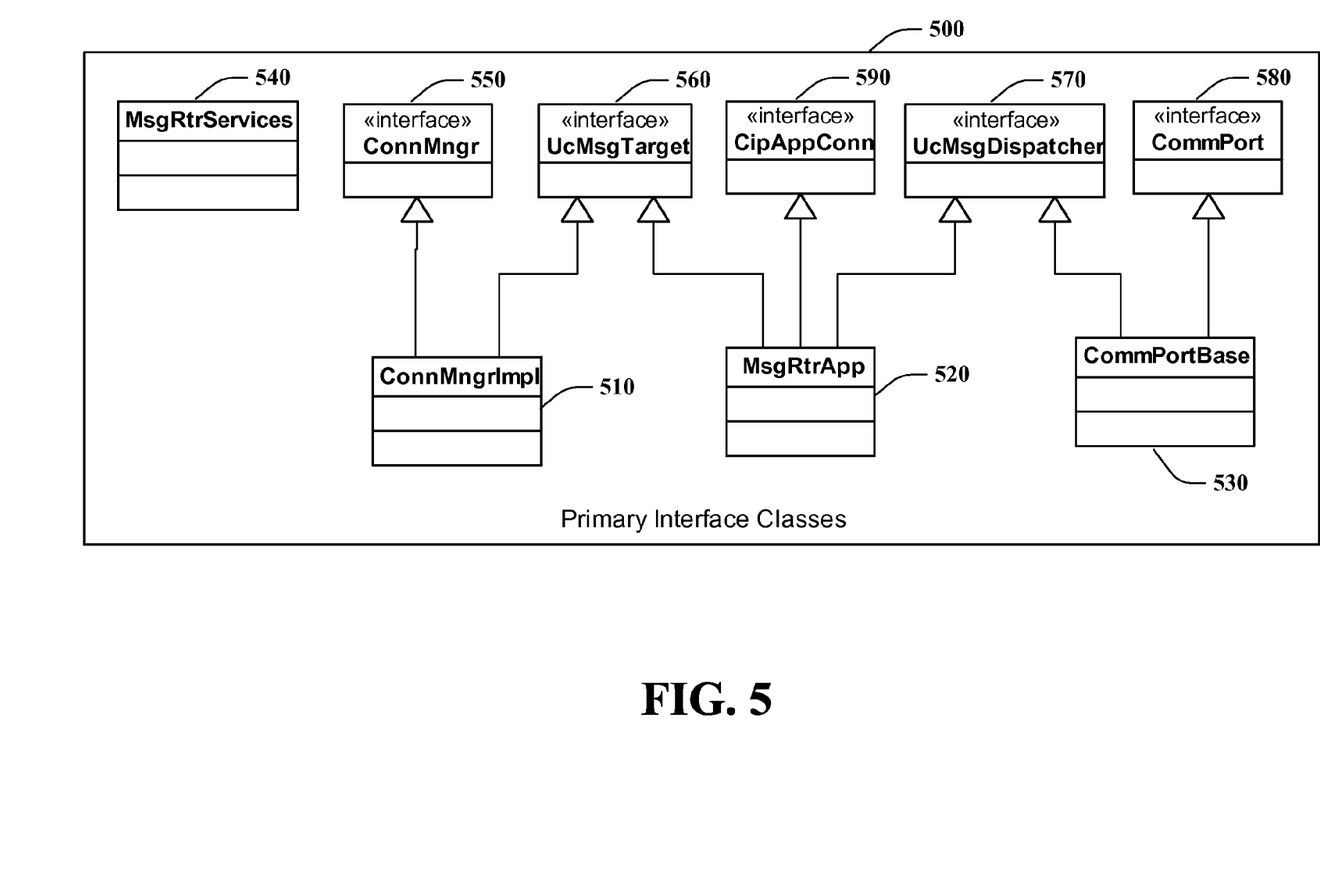
FIGS. 5-9 illustrate example communications methods for communicating between ports and objects in accordance with a layered stack architecture.

Referring to FIG. 5 specifically, primary interface classes 500 are illustrated. The classes 500 can include communications with a connection manager object 510, a message router application 520, and a communications port 530. The interface classes can include one or more of the following classes:

MsgRtrServices 540—Message router services. As implemented, this is technically not an interface class. However, it can be considered as such by its clients. As described earlier, it encapsulates knowledge of the Message Router Request/Response format, and provides services to support unconnected message activity.

ConnMngr 550—The connection manager inherits this interface. It provides services used by communication ports and CIP application objects.

UcMsgTarget 560—Unconnected Message Target interface. The CIP application objects that supports being the target of an unconnected message inherit this interface and register it with the message router services 540. This includes the message router application, a CIP application object.

UcMsgDispatcher 570—Unconnected Message Dispatcher interface. Objects that dispatch unconnected messages inherit this interface. This includes communication ports and the message router application, among others. An object sends its UcMsgDispatcher interface 570 to a UcMsgTarget object 560 to carry out the transaction.

CommPort 580—communications port implementations inherit this interface. A communications port registers its respective CommPort interface 580 with the connection manager 550 to support unconnected message client behavior and to participate in CIP connections.

CipAppConn 590—The CIP application objects which support CIP connections inherit this interface. This provides services to collaborate with the connection manager 550 for opening and closing a connection. An object that acts as a connection target registers its CipAppConn interface 590 with the connection manager in order to receive open requests and participate in CIP connections.

Figure 6:
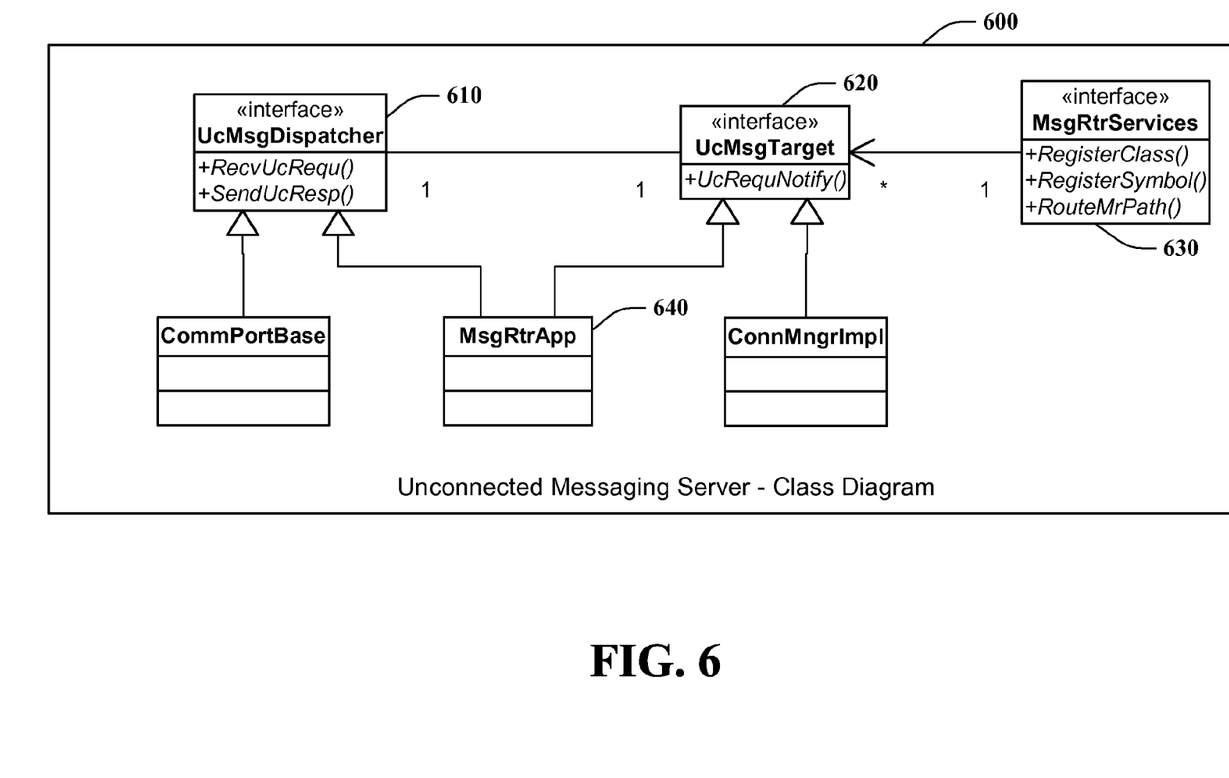

Referring now to FIG. 6, an unconnected message server application 600 is illustrated. Before proceeding, it is noted that a communication module can be at the client (originator) or server (target) end of an unconnected message transaction.

These terms, as used in this document, are defined as follows: The module is considered the server end of the transaction when an unconnected message is received from outside of the module, through a communication port. The module is considered the client end of the transaction when an unconnected message is originated from within the module. This can be initiated by a CIP application object or the connection manager.

Unconnected server behavior involves a message dispatcher and a message target. As shown in the class diagram 600 there are two interface classes defined for the two ends of this transaction. An object that dispatches unconnected messages inherits a UcMsgDispatcher interface 610. An object that receives unconnected messages inherits a UcMsgTarget interface 620. At 630, MsgRtrServices maintains a list of available UcMsgTarget objects that have been registered (by CIP class identifier or symbol). The class diagram 600 shows examples of dispatcher and target objects. There may be other application objects that inherit these interfaces. Of note is a message router application object (MsgRtrApp) 640. This CIP application layer object provides target and dispatcher behavior of unconnected messaging. The MsgRtrApp 640 can dispatch an unconnected message targeted for the connection manager for example, after receiving it in some other manner (e.g., via a class 3 connection). The target of an unconnected request cannot assume that it came from a communication port's UCMM. This supports, in theory at least, for the connection manager to receive connection-related service requests directly from a UCMM (typically achieved) or indirectly via a connection to the MsgRtrApp 640.

Figure 7:
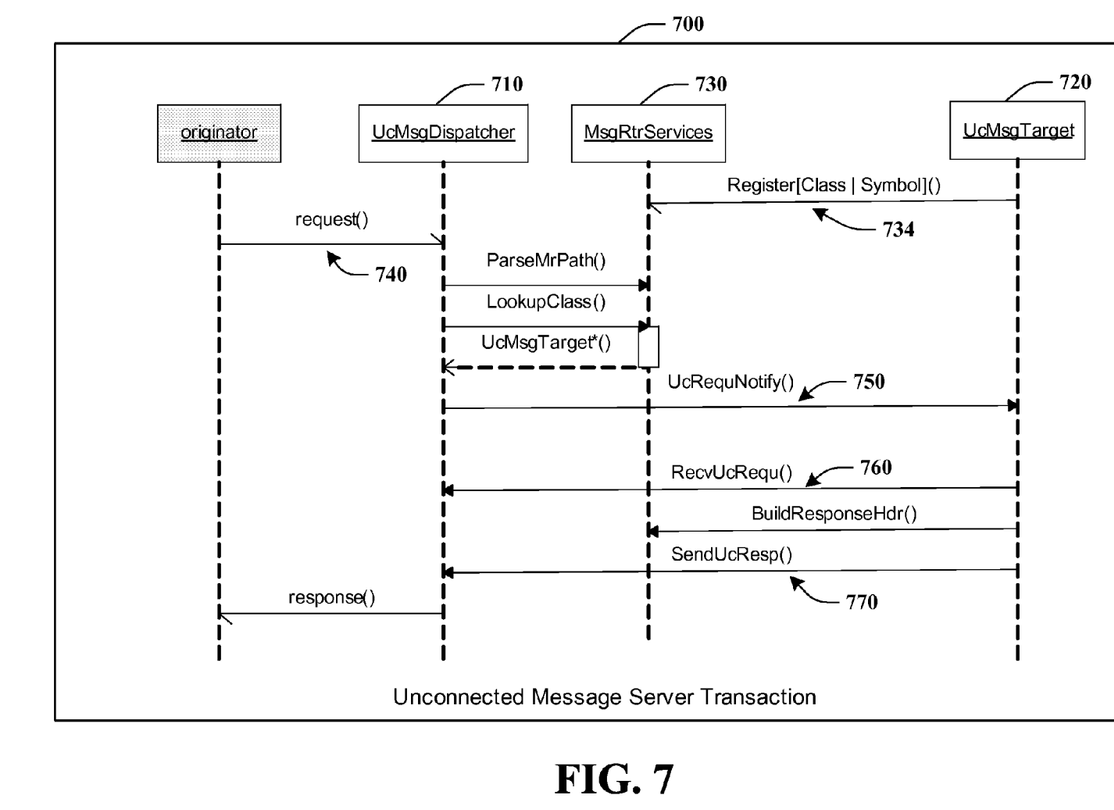

Referring to FIG. 7, a sequence diagram 700 illustrates an example message flow or process methodology for unconnected message server transactions. The sequence diagram 700 shows a collaboration between a dispatcher 710 and a target 720 using the appropriate message router services 730. The target 720 registers with the message router services at 734. The registration provides a pointer to a target object.

When a dispatcher object receives an unconnected message request at 740, it employs the message router services 730 to decode the message router (MR) request packet. A MR header path field specifies an Internal Object Identifier (IOI) of the target of the unconnected message request. If successfully parsed and the target 720 has been registered, then its object pointer is obtained. The dispatcher 710 then notifies the target 720 that a new request is available at 750. Included in the notification is the object pointer of the dispatcher. Then the target uses the dispatcher's services to retrieve the request and to send a response at 770. The dispatcher supports receive and send services within the context of the notification call or subsequent to its completion. This allows an application object with simple unconnected message server behavior that is encapsulated in the thread of the caller of its notification service. The request message can be copied from the UcMsgDispatcher 710 to the UcMsgTarget 720. The response message, returned by the target, can be copied from the UcMsgTarget 720 to the UcMsgDispatcher 710. When the response has been sent to the dispatcher, the unconnected message transaction is complete.

Figure 8:
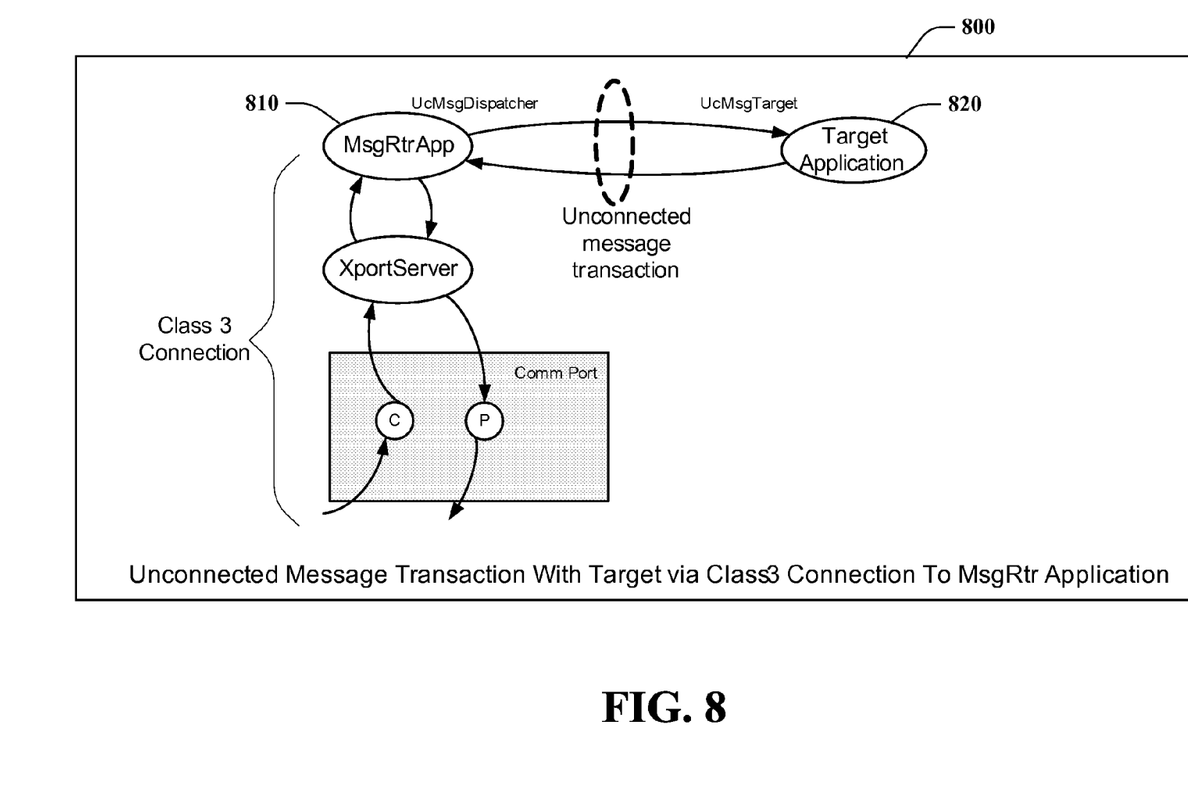

Turning to FIG. 8, an alternative unconnected message transaction 800 is illustrated. A message router application 810 (MsgRtrApp) can have the behavior of providing a class 3 connection point which is used to perform unconnected message transactions with target objects. The transaction diagram 800 illustrates this behavior. The MsgRtrApp 810 supports a class 3 connection that is used to make unconnected message requests to an application object. An unconnected message request is sent encapsulated in a data payload of the class 3 connection. The MsgRtrApp 810 uses the ParseMrPath service of MsgRtrServices to parse an MR header retrieving the pointer to the target object (UcMsgTarget). Having inherited the UcMsgDispatcher interface, the MsgRtrApp 810 then collaborates with the target object at 820 to perform the unconnected message transaction, sending the unconnected message response from the target application object 820 to the connection originator as the data payload of the class 3 connection.

Figure 9:
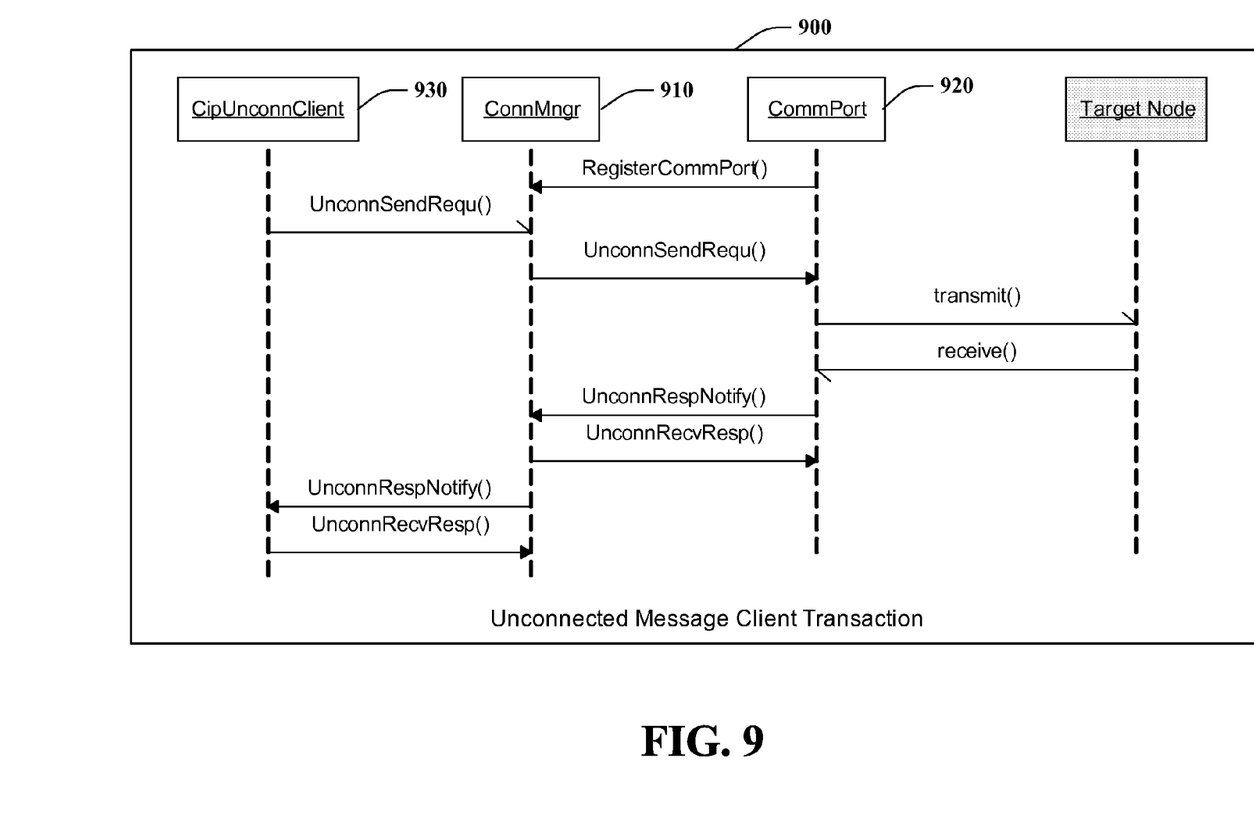

Referring to FIG. 9, an unconnected message client transaction diagram 900 is illustrated. It is noted that a module is considered the client end of the transaction when an unconnected message is originated from within the module with the target in another node. This can be initiated by a CIP application object or the connection manager. For client operation, a connection manager (CM) 910 is capable of originating an unconnected message transaction with a communication port 920. An application object initiates an unconnected message request to the CM 910, which in turn, generates a properly formatted CIP message router request and manages the transaction with the specified communication port 920.

There are specific services defined between an unconnected message client object and the connection manager 910, and between the connection manager and a communication port 920 to carry out the client transaction. The sequence diagram 900 shows an unconnected message transaction initiated by a client object 930 through the connection manager 910. However, for a transaction initiated by the connection manager 910, it is also accurate if a CipUnconnClient lifeline is ignored. The management of the unconnected message timeout behavior is the responsibility of the communication port 920. The CM 910 determines whether the message is to be encapsulated and routed within an Unconnected Send message based on the path to the destination node provided by the application 930. Access to the communication port service to support the transaction is determined by the port identifier specified by the application. If the port identifier has not been registered then the port is unknown and the message is rejected.

Generally, CIP connection activity is established and administered by the connection manager component (CM) 910. A request to open a connection is either originated from outside or inside the associated communication module. As part of opening a connection, the CM 910 is responsible for the creation of the objects that actually carry out the transfer of connected data (e.g., perform the work of the connection). When a connection is activated, the CM 910 is involved in the connection to close it when requested. This may be due to an explicit request by the connection originator, or when notified that a link consumer associated with the connection has timed out. The CM 910 uses methods provided by MsgRtrServices described above to: parse and decode the path field in its service request messages (FwdOpen, and so forth); build response messages to these requests; and/or decode the MR headers in response messages that it receives from other nodes.

If a connection is originated from outside the module, then the open request (FwdOpen) arrives at the connection manager 910 via an unconnected message request. Based on the FwdOpen path field, it is determined whether the connection target is to an application object inside the module or to an application object in another module. The former case results in an application connection involving link connection objects in a communication port, one or more transport objects, and an application object. The latter case results in a bridged connection involving link connection objects in two communication ports.

If a connection is originated from inside the module, then the open request is made to the connection manager 910 by an application object. The application creates the connection by sending a request to the connection manager along with the connection attributes to characterize the connection. If the connection is successfully created, then the application can request the CM 910 to open the connection. Along with this request are all the routing and link addressing details. The connection manager 910 creates the resources to support the connection (for example, transports, link producer and link consumer objects, and CPU capacity). The CM 910 builds the appropriate message and sends it to the target via the specified communication port by initiating an unconnected message request transaction. The CM 910 then manages this transaction and reports the results to the application that originated the request.

Figure 10:
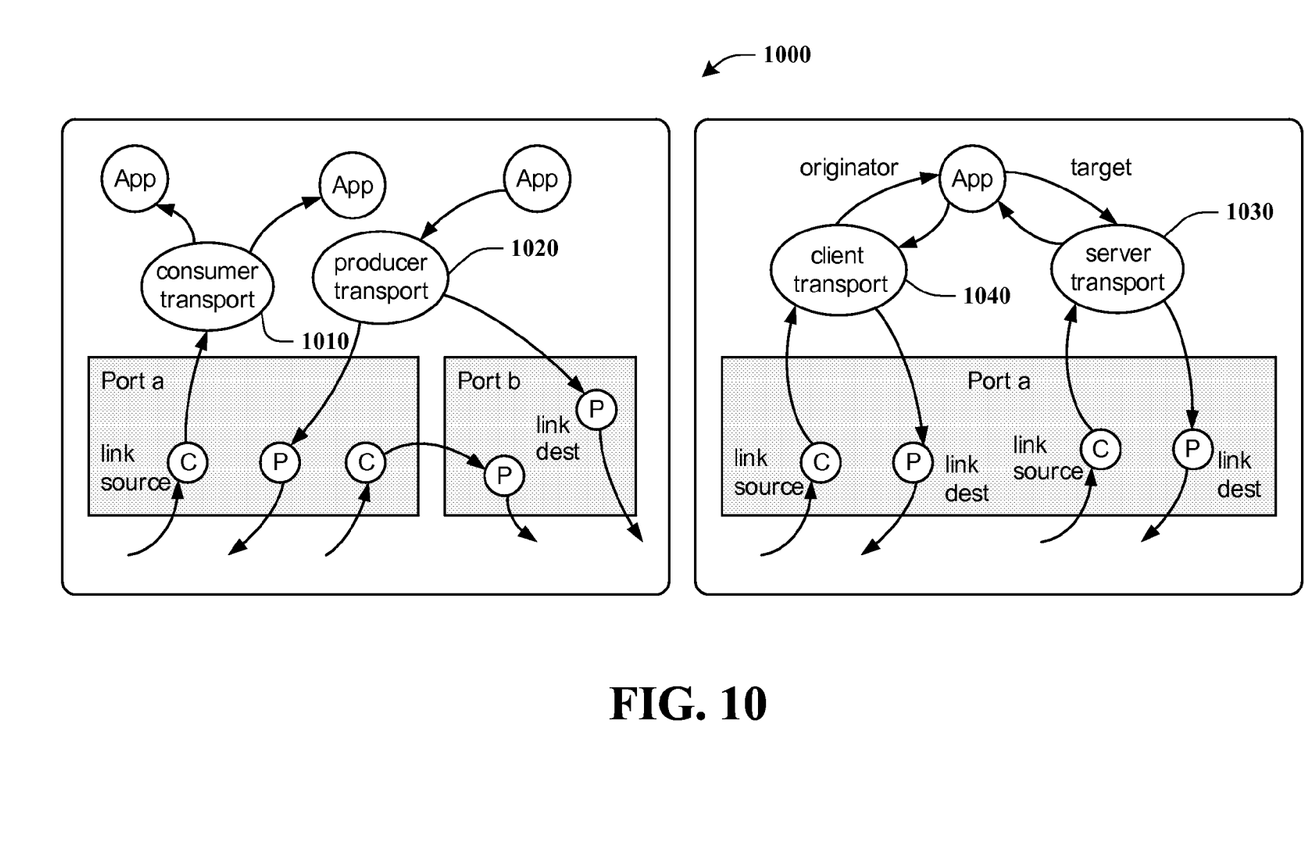
FIG. 10 illustrates example communications between application objects and one or more communications ports.

FIG. 10 illustrates an example communications diagram 1000 between application objects and one or more communications ports. Typically, connections involve link producer, link consumer, transport, and application objects where:

A link consumer resides in a communication port. It receives data from the link (network) and delivers it to one or more destination objects. It is responsible for the connection inactivity timer behavior.

A link producer resides in a communication port. It retrieves data from a source object and transmits it to the link (network). A link producer is notified by the link data source object that data is available, but it determines when to actually retrieve the data from the source and send it on the link.

Transports reside in the CIP core layer and are included in the transport manager component. There are at least four types of transport objects:

1. Consumer transport 1010—used in class 0 and 1 connections. With respect to a link object, the consumer transport 1010 is considered a destination object. It receives data from a link consumer and delivers it to one or more CIP application objects.

2. Producer transport 1020—used in class 0 and 1 connections. With respect to a link object, a producer transport 1020 is considered a source object that receives data from an application object and delivers it to one or more link producers.

3. Server transport 1030—used in class 2 and 3 connections. It is associated with a link consumer, a link producer, and a CIP application object, for example. It manages the target end of the CIP connection.

4. Client transport 1040—used in class 2 and 3 connections. It is associated with a link consumer, a link producer, and a CIP application object, for example. It manages the originator end of the CIP connection.

Generally, an application object resides in the CIP application layer. It is associated with one or more transports. Different behavior is provided based on transport class and whether the application is the target or originator of the connection. Between the Link and CIP core stack layers, there can be one source object and one or more destination objects (1 link consumer, 0 or 1 transport, and 0 or many link producers). When a connected data packet arrives, the source object notifies destination objects associated with it. The determination of when to actually retrieve the data is controlled by the destination object. This allows a link producer to maintain control over when the data is actually sent on the link. A link consumer associated with a class 2 or 3 connection generally limits the number of destination objects to one (class 0 and 1 multicasting is supported).

Between the CIP core and the CIP application layers, there is typically one transport object and one or more application objects. A consumer transport is allowed to be associated with more than one application object. A producer transport is allowed to be associated with more than one link producer object.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial automation system, comprising:
   a memory that stores computer-executable components, the computer executable components comprising:
   a link layer that includes a communications port that drives a data link according to a communication protocol;
   an application layer comprising an application object that facilitates use of a network stack of the communication protocol by an application that uses a different communication protocol; and
   a core layer that bridges communications between the application layer and the link layer and supports messaging between the application object and the communications port; and
   a processor that facilitates execution of at least one of the computer-executable components;
   wherein the core layer at least:
      receives a message router request packet comprising a first pointer to the application object and a new request;
      decodes the message router request packet and parses the first pointer and the new request;
      sends a notification to the application object that the new request is available according to the first pointer, the notification comprising a second pointer to a dispatcher; and
      allows the application object to receive the new request and to send a response via the dispatcher.

2. The system of claim 1, wherein the communications protocol is an industrial protocol, a network protocol, a backplane protocol, a serial protocol, or a wireless protocol.

3. The system of claim 1, wherein the application object is a Common Industrial Protocol application object.

4. The system of claim 1, wherein the core layer includes a transport manager that encapsulates communication between the communications port and the application object according to the protocol.

5. The system of claim 1, wherein the communications port includes an unconnected message manager, a link producer, a link consumer, and a link device driver.

6. The system of claim 1, wherein the application is a web application or a server application.

7. The system of claim 1, wherein the core layer facilitates communication between the communications port and the application object through a message router service.

8. The system of claim 1, wherein the core layer facilitates communication between the communications port and the application object through a connections manager.

9. The system of claim 1, wherein the core layer facilitates communication between the communications port and the application object through an unconnected message target interface.

10. The system of claim 1, wherein the core layer facilitates communication between the communications port and the application object through an unconnected message dispatcher interface.

11. The system of claim 1, wherein the core layer facilitates communication between the communications port and the application object through a communications port interface.

12. The system of claim 1, wherein the core layer at least:
   registers a connection manager with a message router service as an unconnected message target object that supports unconnected message target behavior;
   receives a connection open request through the communication port as an unconnected message server transaction;
   establishes a collaboration between the connection manager, the communication port and the application object; and
   establishes a connection between the application object and the communication port.

13. A method, comprising:
   bridging communications between an application object and a link layer, wherein the application object facilitates use of a network stack of a first communication protocol by an application that uses a second communication protocol and the link layer includes a communications port that drives a data link according to the first communication protocol; and
   supporting messaging between the application object and the communications port;
   wherein the bridging further comprises:
      receiving a message router request packet comprising a first pointer to the application object and a new request;
      decoding the message router request packet and parsing the first pointer and the new request;
      sending a notification to the application object that the new request is available according to the first pointer, the notification comprising a second pointer to a dispatcher; and
      allowing the application object to receive the new request and to send a response via the dispatcher.

14. The method of claim 13, wherein the receiving further comprises receiving the message router request packet according to the first communications protocol.

15. The method of claim 13, wherein the supporting further comprises establishing communication between the application object and a port of the dispatcher.

16. A non-transitory computer readable storage medium having stored thereon computer executable instructions that, in response to execution, cause a computing system to perform operations, the operations comprising:
   bridging communications between an application object and a link layer, wherein the application object facilitates use of a network stack of a first communication protocol by an application that uses a second communication protocol and the link layer includes a communications port that drives a data link according to the first communication protocol; and
   supporting messaging between the application object and the communications port;
   wherein the bridging further comprises:

receiving a message router request packet comprising a first pointer to the application object and a new request;

decoding the message router request packet and parsing the first pointer and the new request;

sending a notification to the application object that the new request is available according to the first pointer, the notification comprising a second pointer to a dispatcher; and allowing the application object to receive the new request and to send a response via the dispatcher.

17. The non-transitory computer readable storage medium of claim 16, wherein the bridging further comprises:

registering a connection manager with a message router service as an unconnected message target object that supports unconnected message target behavior;

receiving a connection open request through the communication port as an unconnected message server transaction;

establishing a collaboration between the connection manager, the communication port and the application object; and establishing a connection between the application object and the communication port.

* * * * *